(12) United States Patent
Kordic et al.

(10) Patent No.: US 7,883,393 B2
(45) Date of Patent: Feb. 8, 2011

(54) SYSTEM AND METHOD FOR REMOVING PARTICLES FROM A POLISHING PAD

(75) Inventors: Srdjan Kordic, Eindhoven (NL); Sebastien Petitdidier, Gieres (FR); Janos Farkas, St. Ismier (FR); Silvio Del Monaco, Avezzano (IT)

(73) Assignees: Freescale Semiconductor, Inc., Austin, TX (US); ST Microelectronics SRL, Agrate Brianza (IT); ST Microelectronics Crolles SAS, Crolles (FR)

( * ) Notice: Subject to any disclaimer, the term of this patent is extended or adjusted under 35 U.S.C. 154(b) by 105 days.

(21) Appl. No.: 12/093,113

(22) PCT Filed: Nov. 8, 2005

(86) PCT No.: PCT/EP2005/013528
§ 371 (c)(1),
(2), (4) Date: May 8, 2008

(87) PCT Pub. No.: WO2007/054125
PCT Pub. Date: May 18, 2007

(65) Prior Publication Data
US 2008/0287041 A1    Nov. 20, 2008

(51) Int. Cl.
*B24B 49/00* (2006.01)

(52) U.S. Cl. .................. 451/7; 451/41; 451/56; 451/287

(58) Field of Classification Search ............. 451/7, 451/41, 56, 285–290
See application file for complete search history.

(56) References Cited

U.S. PATENT DOCUMENTS 5,801,066 A    9/1998  Meikle
5,863,838 A *  1/1999  Farkas et al. ............... 438/693

(Continued)

FOREIGN PATENT DOCUMENTS

EP    0566258 B1    6/1996

(Continued)

OTHER PUBLICATIONS

"Understanding and Evaluating Ultrasonic and Megasonic Cleaners", Azar, Process Cleaning, 10/08.*

(Continued)

*Primary Examiner*—Maurina Rachuba

(57) ABSTRACT

A system for removing particles from a polishing pad to improve the efficiency of the removal of material by the polishing pad as part of a chemical-mechanical polishing process, the system comprising a polishing pad; a fluid dispenser arranged to dispense a fluid on the polishing pad; and removal means, wherein the removal means include a heater for increasing the temperature of the fluid dispensed on the polishing pad, and/or voltage means for coupling the polishing pad to a voltage source for repelling charged particles from the polishing pad surface while the fluid dispenser is dispensing the fluid on the polishing pad.

20 Claims, 4 Drawing Sheets

U.S. PATENT DOCUMENTS

| | | | |
|---|---|---|---|
| 5,885,134 A | 3/1999 | Shibata et al. | |
| 5,957,750 A * | 9/1999 | Brunelli | 451/7 |
| 6,224,461 B1 * | 5/2001 | Boehm et al. | 451/7 |
| 6,290,808 B1 * | 9/2001 | McKee et al. | 156/345.12 |
| 6,341,997 B1 * | 1/2002 | Lin | 451/39 |
| 6,443,814 B1 | 9/2002 | Miller et al. | |
| 6,444,569 B2 | 9/2002 | Farkas et al. | |
| 6,464,568 B2 | 10/2002 | Miller et al. | |
| 6,517,424 B2 | 2/2003 | Wielonski et al. | |
| 6,554,951 B1 | 4/2003 | Page et al. | |
| 6,592,433 B2 | 7/2003 | Buehler | |
| 6,593,282 B1 | 7/2003 | Li et al. | |
| 6,609,962 B1 | 8/2003 | Wakabayashi et al. | |
| 6,632,127 B1 | 10/2003 | Zimmer et al. | |
| 6,666,754 B1 | 12/2003 | Beckage | |
| 6,780,088 B1 | 8/2004 | Nishihara | |
| 6,896,586 B2 * | 5/2005 | Pham et al. | 451/7 |
| 6,953,750 B1 * | 10/2005 | Wu et al. | 438/691 |
| 7,169,014 B2 * | 1/2007 | Taylor et al. | 451/6 |
| 7,452,264 B2 * | 11/2008 | Mavliev et al. | 451/56 |
| 2002/0039877 A1 | 4/2002 | Svirchevski et al. | |
| 2002/0102922 A1 | 8/2002 | Miller et al. | |
| 2002/0106976 A1 | 8/2002 | Miller et al. | |
| 2002/0107155 A1 | 8/2002 | Miller et al. | |
| 2003/0073391 A1 | 4/2003 | Janzen | |
| 2003/0119692 A1 | 6/2003 | So et al. | |
| 2003/0194949 A1 | 10/2003 | Buehler | |
| 2003/0207778 A1 | 11/2003 | So et al. | |
| 2003/0216049 A1 | 11/2003 | Sun et al. | |
| 2004/0154931 A1 | 8/2004 | Hongo et al. | |
| 2007/0077871 A1 * | 4/2007 | Park et al. | 451/56 |
| 2008/0182490 A1 * | 7/2008 | Fang et al. | 451/443 |
| 2008/0311834 A1 | 12/2008 | Lafon et al. | |

FOREIGN PATENT DOCUMENTS

| | | |
|---|---|---|
| EP | 1055486 A2 | 11/2000 |
| EP | 1175964 A2 | 1/2002 |

OTHER PUBLICATIONS

U.S. Appl. No. 12/090,186, Non-Final Office Action mailed Jul. 29, 2010, 13 pages.

* cited by examiner

SYSTEM AND METHOD FOR REMOVING PARTICLES FROM A POLISHING PAD

FIELD OF THE INVENTION

The present invention relates to system and method for removing particles from a polishing pad to improve the efficiency of the removal of material by the polishing pad as part of a chemical-mechanical polishing process.

BACKGROUND OF THE INVENTION

Modern integrated circuit IC devices typically employ shallow trench isolation and multi-level interconnects to meet the demands for increased functionality and faster processing speeds. However, planarization of interlevel dielectrics, conductive layers and trench dielectrics are required when using these technologies to obtain optimum fabrication results.

One technique that provides planarization and has received widespread acceptance in the semiconductor processing industry is chemical-mechanical polishing CMP.

CMP is used to planarize and remove surface topography irregularities of a material layer through chemical reaction and mechanical abrasion.

Typically a CMP process involves placing a substrate (e.g. a semiconductive wafer) face down on a polishing pad where the polishing pad is attached to a rotatable table, or platen. The polishing of the substrate by the polishing pad is normally performed with rotational, linear or orbital motion. Abrasive dispersions and chemical additives, known as slurry, are introduced onto the surface of the polishing pad while the polishing pad is being rotated and the substrate is pressed against the polishing surface of the polishing surface of the polishing pad. Additionally, the substrate may also be rotated in conjunction with the moving polishing pad.

The polishing of the substrate by the chemical-mechanical process is provided by chemical interaction of the slurry, which includes chemical reagents, with the substrate and abrasives contained within the slurry, where typical abrasives used in the CMP include silica, alumina and ceria. However, other abrasives may be used.

The polishing process starts with the chemical interaction between the slurry and the substrate (i.e. material layer) with the abrasives in the slurry, coupled with the movement of the polishing pad relative to the substrate, removing the reacted surface material from the substrate. The polishing process continues until the desired amount of the material layer is removed. Upon completion of the polishing process the substrate is subjected to a cleaning process to remove residual slurry and foreign particles.

However, by semiconductor fabrication standards CMP is inherently a dirty process, which in addition to a significant amount of foreign particles being introduced to the substrate surface also results in a significant amount of foreign particles, for example abrasive particles and by products of the planarization, being introduced to the polishing pad that can result in an undesirable built up of particles on the polishing pad, which is an effect known as 'pad glazing'.

Pad glazing results in the smoothing of the upper surface (i.e. working surface) of the polishing pad causing a reduction in the abrasive properties of the polishing pad and consequently a reduction in the polishing rate.

Additionally, the 'glaze' is often unevenly distributed over a polishing pad surface, which can result in localized differences in polishing rate and increased polishing non-uniformity. Further, the foreign particles attached to the polishing pad can result in increased wafer defectivity such as scratches and particle residues.

One way to alleviate this problem has been via the use of deionised water being dispensed on the polishing pad to aid in the washing off of the foreign particles, however this technique is largely ineffective.

Another solution that has been adopted to address this problem is the use of a conditioning diamond disk that is used to remove the 'glaze' and other unwanted particles from the polishing pad.

The technique of conditioning the polishing pad with a conditioning device involves mechanically abrading the polishing pad surface to remove the glaze and 'renew' the polishing pad surface.

However, it has been found that the conditioning of a polishing pad with a conditioning disk typically results in the foreign particles being transferred to the conditioning disk and as a result a film builds up on the conditioning device and the conditioning capabilities of the conditioning disk are reduced resulting in a lower removal rate of unwanted particles from the polishing pad by the conditioning device and less uniform conditioning of the polishing pad by the conditioning device.

It is desirable to improve this situation.

SUMMARY OF THE INVENTION

In accordance with an aspect of the present invention there is provided a system and method for removing particles from a polishing pad to improve the efficiency of the removal of material by the polishing pad as part of a chemical-mechanical polishing process according to the accompanying claims.

This provides the advantage of improving the efficiency and cleanliness of a polishing pad and for extending the life of the polishing pad, thereby extending the time before a polishing pad requires to be changed. Additionally, by improving particle removal efficiency this will reduce defects in wafers polished by the polishing pad.

BRIEF DESCRIPTION OF THE DRAWINGS

An embodiment of the invention will now be described, by way of example, with reference to the drawings, of which.

DETAILED DESCRIPTION OF THE PREFERRED EMBODIMENTS

Figure 1:
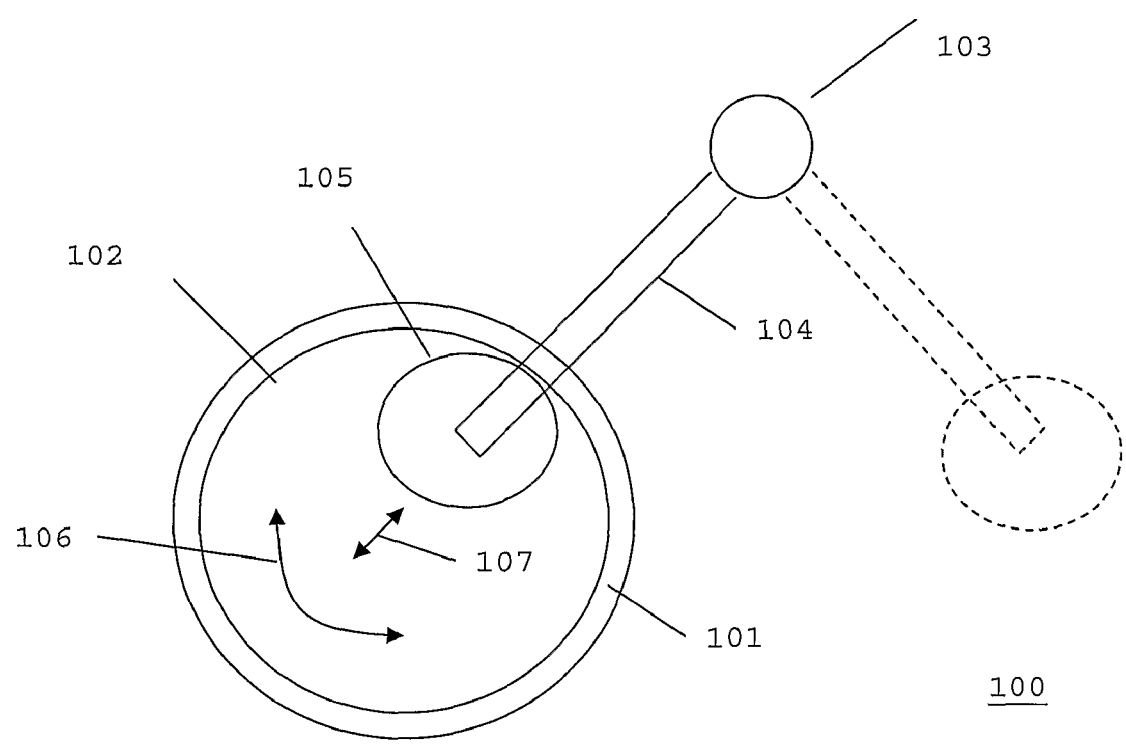
FIG. 1 illustrates a top plan of a polishing pad conditioning system.

FIG. 1 illustrates a top plan of a polishing pad conditioning system 100 that may be used in a chemical-mechanical polishing process.

The polishing pad conditioning system 100 includes a platen 101. The platen 101 is arranged to rotate clockwise or counter-clockwise about a fixed or movable axis. A polishing pad 102 is attached to the platen 101 and as such is rotated by the platen 101. The polishing pad 102 is arranged to provide mechanical abrasion for removing a material layer from a substrate (not shown) during a chemical-mechanical polishing process, as is well known to a person skilled in the art.

The polishing pad conditioning system 100 further includes an optional conditioning device 103 having a conditioning arm 104 that is pivoted to allow the conditioning arm 104 to be disposed either away from the polishing pad 102, as shown by dotted line, or above the polishing pad 102. Attached to the conditioning arm 104, at the opposite end to the pivot, is a conditioning disk 105, for example a diamond disk. The conditioning disk 105 includes a conditioning surface that during conditioning of the polishing pad 102 is in abrasive contact with the polishing pad 102, where the conditioning surface includes an abrasive surface in order to facilitate removal of glaze that may be present on the polishing pad 102. The abrasive surface will typically include periodic protrusions, for example diamonds, that extend partially into the surface of the polishing pad 102 during the conditioning of the polishing pad 102 by the conditioning device 103.

To aid the conditioning process the conditioning disk 105 may be rotated in the same or opposite direction to that of the polishing pad 102. The conditioning disk 105 may be swept back and forth along polishing pad, shown by arrows 106. Additionally, the conditioning disk may be moved from an inner portion of the polishing pad to an outer portion of the polishing pad, as shown by arrow 107.

While the conditioning device 103 is not being used to condition the polishing pad 102 the conditioning device 103 may be placed in a storage position away from the polishing pad 102, as shown by the dotted lines in FIG. 1.

Figure 2:
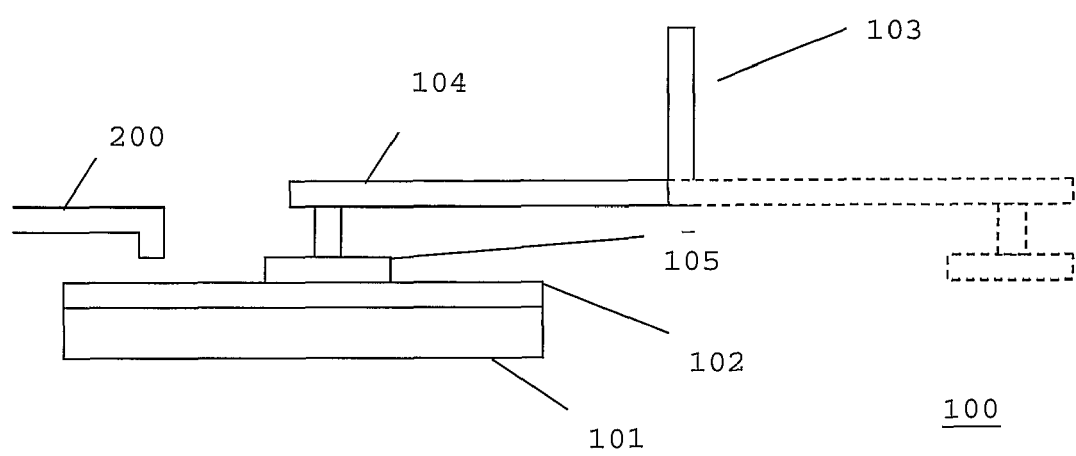
FIG. 2 illustrates a side view of a polishing pad conditioning system according to a first embodiment.

FIG. 2 illustrates a side view diagram of the pad conditioning system 100 according to one embodiment of the present invention for removing particles from the polishing pad 102, where the same features as those shown in FIG. 1 have the same reference numerals. Located above the polishing pad 102 is a first conduit 200 that is arranged to dispense a rinsing fluid, for example deionised water, and/or a chemical reagent onto the polishing pad 102 where typically the rinsing fluid also contains the chemical reagent. However, as would be appreciated by the person skilled in the art, alternative designs for locating the first conduit 200 could be adopted, for example a conduit could be integrated into the conditioning device 103 for dispensing the rinsing fluid and/or chemical reagent. The chemical reagent is a chemical solution that is suitable to remove slurry by products such as ammonia, carboxylic acids (for example citric acid or commercially available chemicals such as electraclean) or Ammonium hydroxide. Ideally the characteristics of the chemical reagent are chosen to have an appropriate pH and redox potential with reactive entities such as surfactant or ligand to solubilize the generated polishing by-products disposed on the polishing pad 102, where the contaminants will depend upon the material being polished and the chemical used.

As also shown in FIG. 2, and as stated above, should the optional conditioning device 103 form part of the polishing pad conditioning system the conditioning device 103 may be suspended in a storage position away from the polishing pad 102, as shown by the dotted lines.

Coupled to the first conduit 200 is a heating element (not shown) that is arranged to heat the rinsing fluid and/or chemical reagent as it is being dispensed on the polishing pad 102. Typically, the rinsing fluid and/or chemical reagent will be heated to a temperature between 25 and 60 degrees Celsius. The purpose of dispensing the rinsing fluid and/or chemical reagent onto the polishing pad 102 is to reduce the accumulation of previously used slurry and/or glaze present on the polishing pad 102, where the inventors of the present invention have recognised that heating the rinsing fluid and/or chemical reagent enhances this process.

Although the above description describes the heating of the rinsing fluid and/or chemical reagent as they are being dispensed on the polishing pad 102 the rinsing fluid and/or chemical reagent could be arranged to be heated prior to being dispensed on the polishing pad 102, for example while the rinsing fluid and/or chemical reagent are being kept in a storage reservoir (not shown). By increasing the temperature of the rinsing fluid and/or chemical reagent this results in an increase in overall reaction kinetics such as complexation and solubilisation.

By heating the rinsing fluid and/or chemical reagent this has the additional advantage of reducing rinsing fluid and/or chemical consumption as less fluid and/or chemicals are needed to solubilize by products of the polishing process. This is a consequence of the increased temperature increasing the speed of solubilisation of the by-products, thus as less time is taken to solubilise by-products less chemicals are required.

Figure 3:
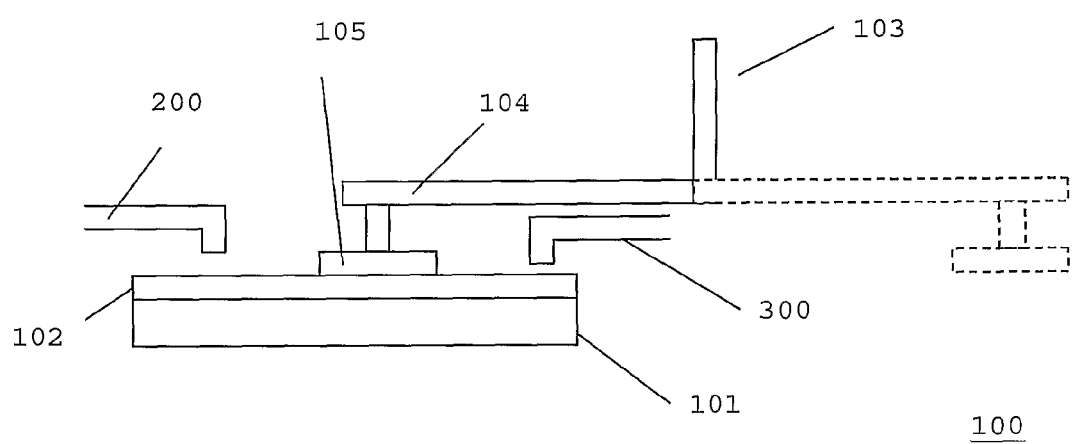
FIG. 3 illustrates a side view of a polishing pad conditioning system according to a second embodiment.

An additional or alternative method for conditioning the polishing pad to that of heating the rinsing fluid and/or chemical reagent involves the use of ultrasonics or megasonics, which is illustrated in FIG. 3 in which the corresponding features to those shown in FIG. 1 and FIG. 2 have the same reference numerals.

As shown in FIG. 3, in addition to the first conduit 200 being located above the polishing pad 102 there is also mounted an acoustic nozzle 300 arranged to emit a megasonic or ultrasonic wave at the polishing surface of the polishing pad 102 to aid in the removal of glaze and slurry build up on the polishing surface, which is further assisted by the rinsing fluid and/or chemical reagent being dispensed on the polishing pad, which is ideally performed at the same time as the use of the ultrasonics/megasonics. Any suitable ultrasonic or megasonic frequency for removing particles from the polishing pad may be used, however, a preferred frequency would be in the range of 0.7 to 1.2 MHz. Additionally, the power supply of the ultrasonics/megasonics will preferably be in the range of 0.5 to 5 W/cm$^2$.

As would be appreciated by a person skilled in the art the acoustic nozzle 300 could be mounted in a variety of different locations, for example if a conditioning device forms part of the polishing pad conditioning system the acoustic nozzle could be incorporated onto the conditioning device, thereby allowing megasonic energy to be applied to the polishing pad as the conditioning disk is moved across the polishing pad. Additionally or alternatively the acoustic nozzle could be mounted below the polishing pad so that megasonic energy is applied through the platen to the polishing pad and through the polishing pad to the fluid on the pad.

Figure 4:
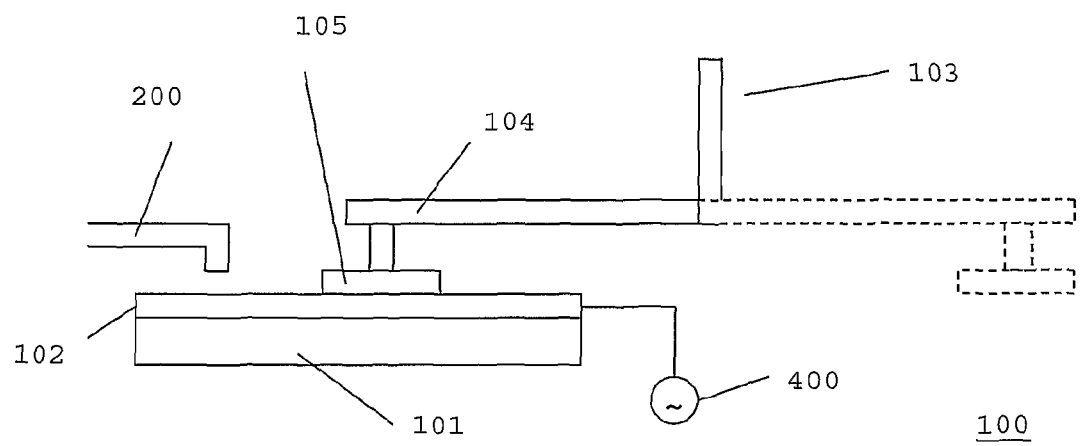
FIG. 4 illustrates a side view of a polishing pad conditioning system according to a third embodiment.

An additional or alternative method for conditioning the polishing pad to that of heating the rinsing fluid and/or chemical reagent and/or the use of megasonics involves the applying of a electrical potential to a conductive polishing pad as illustrated in FIG. 4 in which the corresponding features to those shown in FIG. 1, FIGS. 2 and 3 have the same reference numerals.

As shown in FIG. 4, in addition to the first conduit 200 being located above the polishing pad 102 there is also coupled to the polishing pad 102 a voltage source 400 for applying an electrical potential to the polishing surface of the polishing pad 102 where, as stated above, the polishing pad 102 is arranged to be conductive. Any suitable means for coupling the polishing pad 102 to the voltage source 400 may be used.

Ideally, the electrical potential will be applied to the polishing pad at the same time as the fluid is being dispensed on the polishing pad as the chemicals in the fluid are designed to solubilize the by-products on the polishing pad and the electrical potential prevents particle re-deposition.

The electrical potential applied to the polishing pad 102 will typically be in the range of 0.1 to 10 volts, however other voltages may be used. The voltage selected will typically depend on the particles to be removed from the polishing pad 102 and the charge to be applied on it.

The polarity of the potential is ideally selected so that the electrostatic force from the potential will result in a repulse interaction between the particles and the adhering surfaces in the respective cleaning chemicals. During the conditioning process the by-product particles could be in contact with different surfaces, for example polishing pad, conditioning disk, where these different surfaces can have different surface chemistries.

Further the polarity and the amplitude of the voltage could be changed during the cleaning/conditioning cycle to ensure that the particles are sufficiently removed from all the surfaces.

In contrast, the use of chemicals alone involves significantly more complexity in the choice of appropriate chemicals to provide repulsive forces between the particles of the by-products and the surfaces involved.

Another benefit of applying an external potential is that it can generate significantly higher repulsive force compared to the repulsive force generated by the surface chemistry of the particles. For example, the charges around the by-product particles in the hydrodynamic slippage plane are typically only in the order of 10 to 100 mV, the external voltage potential can be one to three orders of magnitude greater.

The electrical potential applied to the polishing pad 102 has the effect of repelling particles having an electrical charge with the same polarity as the electrical potential being applied to the polishing pad 102. Consequently, although a constant voltage source could be applied to the polishing pad 102 it is a preferred embodiment for the electrical potential to be alternated to allow differently charged particles to be 'lifted off', from the surface of the polishing pad 102. The alternating frequency of the voltage potential would ideally be of the order of 0.1 to 10 Hz. Further, specially designed 'cleaning waveforms' could be adopted, where the frequency of the alternating voltage being applied to the polishing pad 102 is arranged to take into account the Zeta potential and density of the differently charged particles on the polishing pad 102, where the zeta potential is the electrical potential derived by the surface charges of the by-product particles and measured in the hydrodynamic slippage plane of the particles in the respective electrolyte.

The conditioning of the polishing pad 102 using the techniques described above will typically be performed for a predetermined period of time. As the conditioning of the polishing pad will typically not exceed the time available during the production process the conditioning of the polishing pad will typically occur for periods of 5 to 40 seconds.

It will be apparent to those skilled in the art that the disclosed subject matter may be modified in numerous ways and may assume embodiments other than the preferred forms specifically set out as described above, for example the pad conditioning system may include more than one polishing pad 102 and/or the optional conditioning device 103 may be used in conjunction with one or more of the above described processes for removing particles from a polishing pad.

The invention claimed is:

1. A system for removing particles from a polishing pad to improve the efficiency of the removal of material by the polishing pad as part of a chemical-mechanical polishing process, the system comprising;
   a polishing pad;
   a fluid dispenser arranged to dispense a fluid on the polishing pad;
   a heater for increasing the temperature of the fluid dispensed on the polishing pad while the polishing pad is polishing a substrate; and
   a voltage circuit for coupling the polishing pad to a voltage source for repelling charged particles from the polishing pad surface while the fluid dispenser is dispensing the fluid on the polishing pad.

2. A system according to claim 1, wherein the fluid dispenser is arranged to dispense deionised water.

3. A system according to claim 2, wherein the fluid dispenser is arranged to dispense a chemical reagent.

4. A system according to claim 1, wherein the fluid dispenser is arranged to dispense a chemical reagent.

5. A system according to claim 4, wherein the chemical reagent is a chemical suitable to remove slurry by-products.

6. A system according to claim 1, further comprising an acoustic nozzle arranged to emit an ultrasonic or megasonic signal at the polishing pad while the fluid dispenser is dispensing the fluid on the polishing pad.

7. A system according to claim 6, wherein the acoustic nozzle is capable of operating at a frequency in a range of 0.7 to 1.2 MHz.

8. A system according to claim 7, wherein the fluid dispenser is arranged to dispense fluid and the acoustic nozzle is arranged to emit a megasonic signal while the polishing pad is polishing a substrate.

9. A system according to claim 6, wherein the fluid dispenser is arranged to dispense fluid and the acoustic nozzle is arranged to emit a megasonic signal while the polishing pad is polishing a substrate.

10. The system of claim 1, wherein the system comprises the heater.

11. A system according to claim 10, wherein the heater is arranged to heat the fluid to a temperature above 25 degrees Celsius.

12. The system of claim 1, wherein the system comprises the voltage circuit.

13. A system according to claim 12, wherein the voltage source is arranged to alternate to allow opposite charged particles to be removed from the polishing pad.

14. A system according to claim 12, wherein the voltage source is configured to operate at a voltage in a range of 0.1 and 10 volts.

15. A system according to claim 12, wherein the polishing pad is arranged to be conductive.

16. The system of claim 1, wherein the fluid dispenser comprises a conduit, wherein the heater is coupled to the conduit.

17. A method for removing particles from a polishing pad to improve the efficiency of the removal of material by the polishing pad as part of a chemical-mechanical polishing process, the method comprising:
   dispensing a fluid on the polishing pad;
   increasing the temperature of the fluid dispensed on the polishing pad while the polishing pad is polishing a substrate; and
   coupling the polishing pad to a voltage source for repelling charged particles from the polishing pad surface while dispensing the fluid on the polishing pad.

18. The method of claim 17, wherein increasing the temperature comprises heating the fluid to a temperature in a range of 25 to 60° C.

19. The method of claim 17, wherein the method includes alternating a voltage of the voltage source at a frequency in a range of 0.1 to 10 Hz.

20. The method of claim 17, wherein increasing the temperature of the fluid comprises heating the fluid while the fluid is within a conduit.

* * * * *